United States Patent
Sun et al.

(10) Patent No.: US 10,038,277 B2
(45) Date of Patent: Jul. 31, 2018

(54) CARD EDGE CONNECTOR WITH METAL LATCH

(71) Applicant: FOXCONN INTERCONNECT TECHNOLOGY LIMITED, Grand Cayman (KY)

(72) Inventors: Wei-Guo Sun, Kunshan (CN); Guang-Lei Xu, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/728,515

(22) Filed: Oct. 10, 2017

(65) Prior Publication Data
US 2018/0102608 A1  Apr. 12, 2018

(30) Foreign Application Priority Data
Oct. 10, 2016  (CN) .......................... 2016 1 0882265

(51) Int. Cl.
| H01R 13/62 | (2006.01) |
| H01R 13/627 | (2006.01) |
| H01R 12/72 | (2011.01) |

(52) U.S. Cl.
CPC ....... H01R 13/6275 (2013.01); H01R 12/721 (2013.01)

(58) Field of Classification Search
CPC .......................... H01R 13/6275; H01R 12/721
USPC ........................................................ 439/326
See application file for complete search history.

(56) References Cited

U.S. PATENT DOCUMENTS

| 6,042,411 A * | 3/2000 | Choy ................. H01R 12/7005 439/326 |
| 6,176,725 B1 * | 1/2001 | Kobayashi ............. H01R 12/83 439/326 |
| 6,341,971 B1 * | 1/2002 | Choy ..................... H01R 12/83 439/326 |
| 6,743,028 B2 * | 6/2004 | Wang ..................... H01R 12/83 439/328 |
| 6,796,825 B2 * | 9/2004 | Wang ................. H01R 13/6315 439/326 |

(Continued)

FOREIGN PATENT DOCUMENTS

| TW | M384440 | 7/2010 |
| TW | M428562 | 12/2011 |

*Primary Examiner* — Ross Gushi
(74) *Attorney, Agent, or Firm* — Wei Te Chung; Ming Chieh Chang (57) ABSTRACT

An electrical card edge connector includes an elongated insulative housing forming a central slot with two rows of terminals disposed by two sides of the central slot and retained in the housing. The housing includes two opposite lengthwise side walls and two end walls connected to two opposite ends of the corresponding lengthwise walls, and a bottom wall linked to both the lengthwise walls and the end walls below the central slot. The terminals are disposed in the corresponding side walls. A pair of metal latches are fixed to the corresponding end walls, respectively. Each metal latch include a front restriction piece received in the corresponding through hole, a rear restriction piece received in the notch, and a locking piece located adjacent to the rear restriction piece and downwardly pressing an upper surface of the memory module.

20 Claims, 13 Drawing Sheets

(56) References Cited

U.S. PATENT DOCUMENTS

| | | | | |
|---|---|---|---|---|
| 6,939,156 | B2* | 9/2005 | Lee | G06K 7/0047 439/328 |
| 6,948,964 | B2* | 9/2005 | Lee | H05K 7/1431 439/328 |
| 7,048,565 | B2* | 5/2006 | Lin | G06F 1/184 439/326 |
| 7,074,067 | B2* | 7/2006 | Yang | H01R 12/83 439/326 |
| 7,175,461 | B1* | 2/2007 | Ju | H01R 12/7005 439/159 |
| 7,445,497 | B2* | 11/2008 | Zhang | H01R 33/7671 439/326 |
| 7,494,361 | B2* | 2/2009 | Ho | H01R 13/635 439/260 |
| 7,717,728 | B1* | 5/2010 | Wang | H01R 12/7029 439/328 |
| 7,789,692 | B2* | 9/2010 | Lee | H01R 12/721 439/327 |
| 7,828,580 | B2* | 11/2010 | Zhu | H01R 12/707 439/326 |
| 7,927,114 | B2* | 4/2011 | Li | H01R 12/721 439/108 |
| 7,927,120 | B1* | 4/2011 | Wang | H01R 12/57 439/328 |
| 8,052,435 | B1* | 11/2011 | Wang | H01R 12/707 439/83 |
| 8,062,047 | B1* | 11/2011 | Wang | H01R 12/707 439/328 |
| 8,251,727 | B2* | 8/2012 | Zhu | H01R 12/707 439/327 |
| 8,251,728 | B2* | 8/2012 | Zhu | G06K 7/0047 439/328 |
| 8,308,499 | B2* | 11/2012 | Yeh | H01R 13/514 439/326 |
| 8,323,045 | B2* | 12/2012 | Kato | H01R 13/6275 439/326 |
| 8,388,362 | B2* | 3/2013 | Su | H01R 12/7029 439/153 |
| 8,393,908 | B2* | 3/2013 | Li | G06K 13/08 439/159 |
| 8,398,422 | B2* | 3/2013 | Zhu | H01R 13/428 439/326 |
| 8,430,678 | B2* | 4/2013 | Yeh | H01R 4/02 439/83 |
| 8,454,380 | B2* | 6/2013 | Zhu | H01R 12/7029 439/326 |
| 8,465,314 | B2* | 6/2013 | Kato | H01R 12/721 439/327 |
| 8,613,628 | B2* | 12/2013 | Kato | H01R 12/7029 439/327 |
| 8,636,534 | B2* | 1/2014 | Zhu | H01R 13/6275 439/328 |
| 8,851,916 | B2* | 10/2014 | Chen | H01R 13/6275 439/327 |
| 8,932,077 | B2* | 1/2015 | Li | H01R 12/721 439/328 |
| 8,961,211 | B2* | 2/2015 | Zhu | H01R 13/62 439/326 |
| 9,004,934 | B2* | 4/2015 | Xu | H01R 12/7029 439/327 |
| 9,004,936 | B2* | 4/2015 | Wang | H01R 12/83 439/387 |
| 9,190,754 | B2* | 11/2015 | Wang | H01R 12/721 |
| 9,219,321 | B2* | 12/2015 | Chen | H01R 12/721 |
| 9,225,113 | B2* | 12/2015 | Kato | H01R 13/6275 |
| 9,559,448 | B2* | 1/2017 | Sasada | G06K 7/003 |
| 2004/0248451 | A1* | 12/2004 | Lee | G06K 7/0047 439/328 |
| 2005/0164539 | A1* | 7/2005 | Lee | H05K 7/1431 439/328 |
| 2006/0094277 | A1* | 5/2006 | Yang | H01R 12/83 439/328 |
| 2007/0270004 | A1* | 11/2007 | Ho | H01R 13/635 439/136 |
| 2011/0039454 | A1* | 2/2011 | Zhu | H01R 13/64 439/680 |
| 2011/0059629 | A1* | 3/2011 | Chen | H01R 12/707 439/64 |
| 2011/0111614 | A1* | 5/2011 | Kato | H01R 12/721 439/328 |
| 2011/0263159 | A1* | 10/2011 | Chen | H01R 12/7029 439/630 |
| 2011/0300734 | A1* | 12/2011 | Zhu | H01R 13/41 439/325 |
| 2013/0109214 | A1* | 5/2013 | Ching | H01R 12/7005 439/328 |
| 2013/0288503 | A1* | 10/2013 | Zhu | H01R 13/62 439/327 |
| 2014/0080343 | A1* | 3/2014 | Wang | H01R 12/721 439/325 |
| 2014/0080345 | A1* | 3/2014 | Xu | H01R 12/7029 439/327 |
| 2015/0024622 | A1* | 1/2015 | Jin | H01R 12/7029 439/355 |
| 2015/0050828 | A1* | 2/2015 | Xu | H01R 12/7029 439/350 |

* cited by examiner

CARD EDGE CONNECTOR WITH METAL LATCH

BACKGROUND OF THE DISCLOSURE

1. Field of the Disclosure

The invention is related to an electrical connector, and particularly to the card edge connector equipped with a metal latch locking a memory module therein.

2. Description of Related Arts

The traditional card edge connector as shown in TWM428562 includes an elongated insulative housing defining a central slot with two rows of terminals by two sides wherein a pair of metal latches are assembled to two opposite ends of the housing and the corresponding memory module includes a locking notch and a through hole in each lateral side. Anyhow, the latch fails to efficiently retain the memory module in position during mating.

It is desired to provide a card edge connector with the reliable metal latches for retaining the memory module in the connector.

SUMMARY OF THE DISCLOSURE

To achieve the above desire, a card edge connector includes an elongated insulative housing forming a central slot with two rows of terminals disposed by two sides of the central slot and retained in the housing. The housing includes two opposite lengthwise side walls and two end walls connected to two opposite ends of the corresponding lengthwise walls, and a bottom wall linked to both the lengthwise walls and the end walls below the central slot. The terminals are disposed in the corresponding side walls. A pair of metal latches are fixed to the corresponding end walls, respectively. Each metal latch include a front restriction piece received in the corresponding through hole, a rear restriction piece received in the notch, and a locking piece located adjacent to the rear restriction piece and downwardly pressing an upper surface of the memory module.

DETAILED DESCRIPTION OF THE PREFERRED EMBODIMENT

Reference will now be made in detail to the embodiments of the present disclosure. Referring to FIGS. 1-11 (C), an electrical card edge connector assembly includes an electrical card edge connector 100 for mounting to a printed circuit board (not shown) and for mating with a memory module 600. The memory module 600 forms a bottom mating section 60 and two lateral side sections 61. A plurality of gold fingers 601 are formed on two opposite surfaces of the mating section 60. The mating section 60 further forms a key receiving slot 602 for assuring the corresponding orientation of the memory module 600 in the connector 100. The latch side section 61 includes a pair of through holes 611 adjacent to the gold fingers 601, and a pair of notches 612 far away from the gold fingers 601 and laterally outwardly exposed to an exterior.

The connector 100 includes an elongated insulative housing 10, two rows of terminals 20 disposed in the housing 1, and a pair of metal latches 30 on two opposite ends of the housing 1. The housing 1 forms a receiving slot 11 to receive the memory module 600, and includes a pair of lengthwise side walls 12 by two sides of the receiving slot 11. A key 14 is formed in the receiving slot 11. During mating, the mating section 60 is received in the receiving slot 11 with the terminals 20 mechanically and electrically connected to the corresponding gold fingers 601 and the key 14 received within the key receiving slot 602.

The pair of lengthwise walls 12 include a first/lower side wall 121, a second/upper side wall 122. The first/lower terminals 21 are received in the first side wall 121, and the second/upper terminals 22 are received in the second side walls 122. The first side wall 121 forms a plurality of first passageways 123 to receive the corresponding first terminals 21, respectively, and the second side wall 122 forms a plurality of second passageways 124 to receive the corresponding second terminals 22, respectively. The first terminal 21 includes a first fixing section 211, a first resilient section 212 extending rearwardly from the first fixing section 211, and a first soldering section 213 extending forwardly from the first fixing section 211. The second terminal includes a second fixing section 221, a second resilient section 222 forwardly extending from the second fixing section 221, and a second soldering section 223 rearwardly extending from the second fixing section 221. Notably, the first resilient sections 212 and the second resilient sections 222 are staggered with each other along the longitudinal direction to comply with the fold fingers 601. The first soldering sections 213 and the second soldering section 223 are located upon a same horizontal plane for surface mounting to the printed circuit board.

The housing 10 further includes a pair of end walls 13 at two opposite ends of the corresponding side walls 12 in the longitudinal direction. The receiving slot 11 is forwardly open to the exterior. The end walls 13 extend forwardly farther than the side walls 12. The pair of latches 30 are respectively fixed to the end walls 13, respectively. The latch 30 forms the front restriction piece 322 received in the hole 611 and a positioning part 321 including a rear restriction piece 333 received in the notch 612.

In the presently preferred embodiment, the metal latch 30 is made of two pieces. Understandably, in another embodiment, the metal latch 30 could be made of one piece. The metal latch 30 includes a first metal piece 311 and a second metal piece 32 on which the positioning part 321 and the front restriction piece 322 is formed. The end wall 13 includes an inner face 131 facing toward the receiving slot 11, and an outer face 132 facing away from the receiving slot 11. The outer face 132 forms a slot 133, and the inner face 131 forms a slot 134 and a protrusion 135 in the slot 134. The first metal piece 31 is secured to the inner face 131 while the second metal piece is secured to the outer face 131.

The first metal piece 31 includes a first main body 312 with a fixing hole 313 therein to receive the corresponding protrusion 135 for securing therebetween, and a solder pad 311 extending inwardly from a bottom edge of the first main body 312. The first main body 312 includes a front section 314, a middle section 315 and a rear section 316. The middle section 315 is dimensioned larger than those of the front section 314 and the rear section 316 in the vertical direction. A retention rib 317 is formed on the middle section 315, and the fixing hole 313 is formed in the rear section 316. The solder pad 311 forms a cutout 318 for soldering to the printed circuit board.

The second metal piece 32 forms a second main body 323 including a first section 325, a second section 326 and a third section 327 wherein the first section 325 and the third section 327 are parallel to each other in the front-to-back direction while being offset from each other in the longitudinal direction with the second section 326 linked therebetween. The positioning part 321 extends from a top edge of the first section 325 and includes an inwardly extending extension section 332 and a rear restriction piece 333 extending downwardly from the extension section 332. The front restriction piece 322 extends from the third section 327 and includes a horizontal section 329 and an insertion section 331 upwardly extending from the horizontal section 329. Notably, the positioning part 321 and the front restriction piece 322 extend in an opposite manner in the vertical direction. The first main body 312 further includes a restraint/support piece 334 extending from the bottom edge of the first section 325 and located under the positioning part 321.

Figure 1:
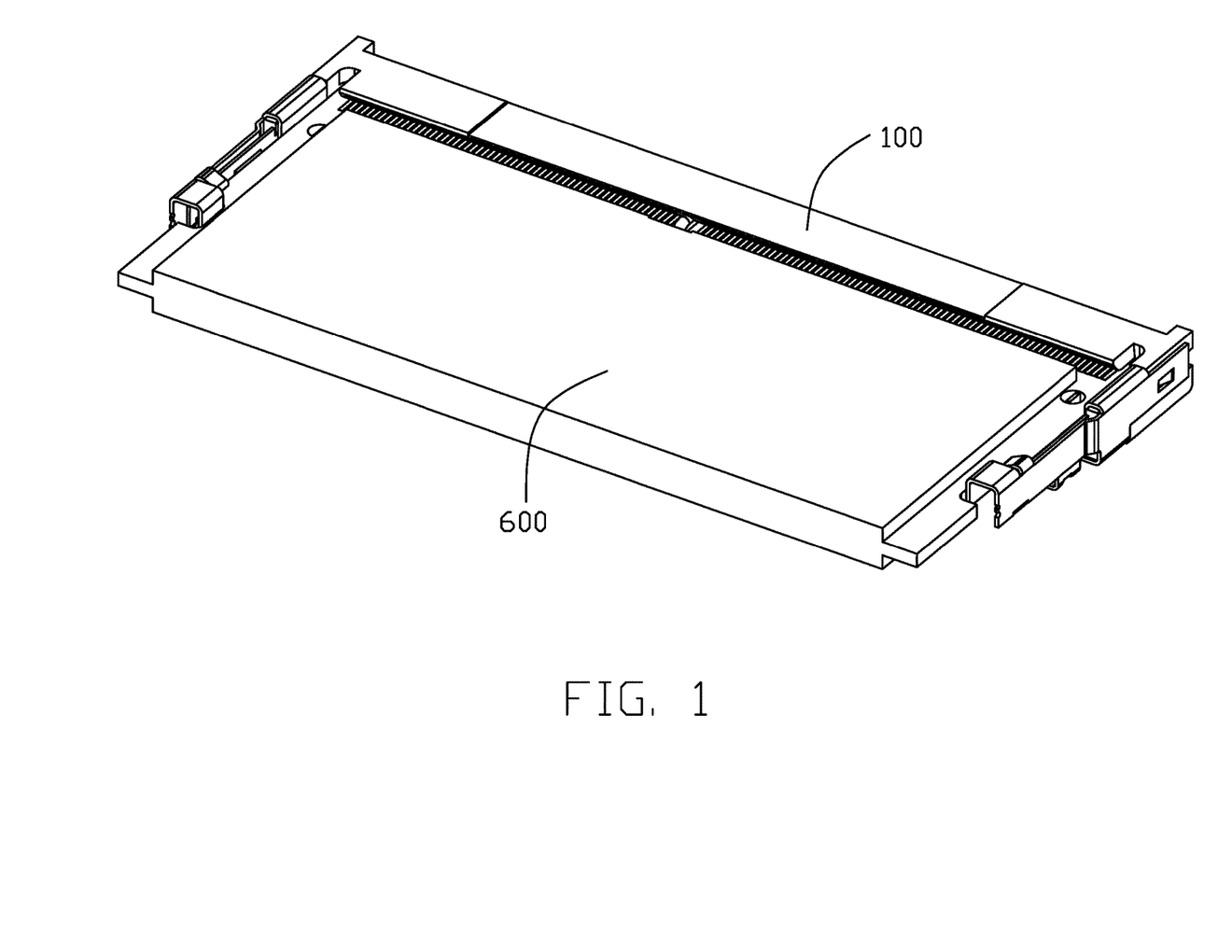
FIG. 1 is a perspective view of an electrical card edge connector assembly with the memory module received therein according to the invention.
Figure 2:
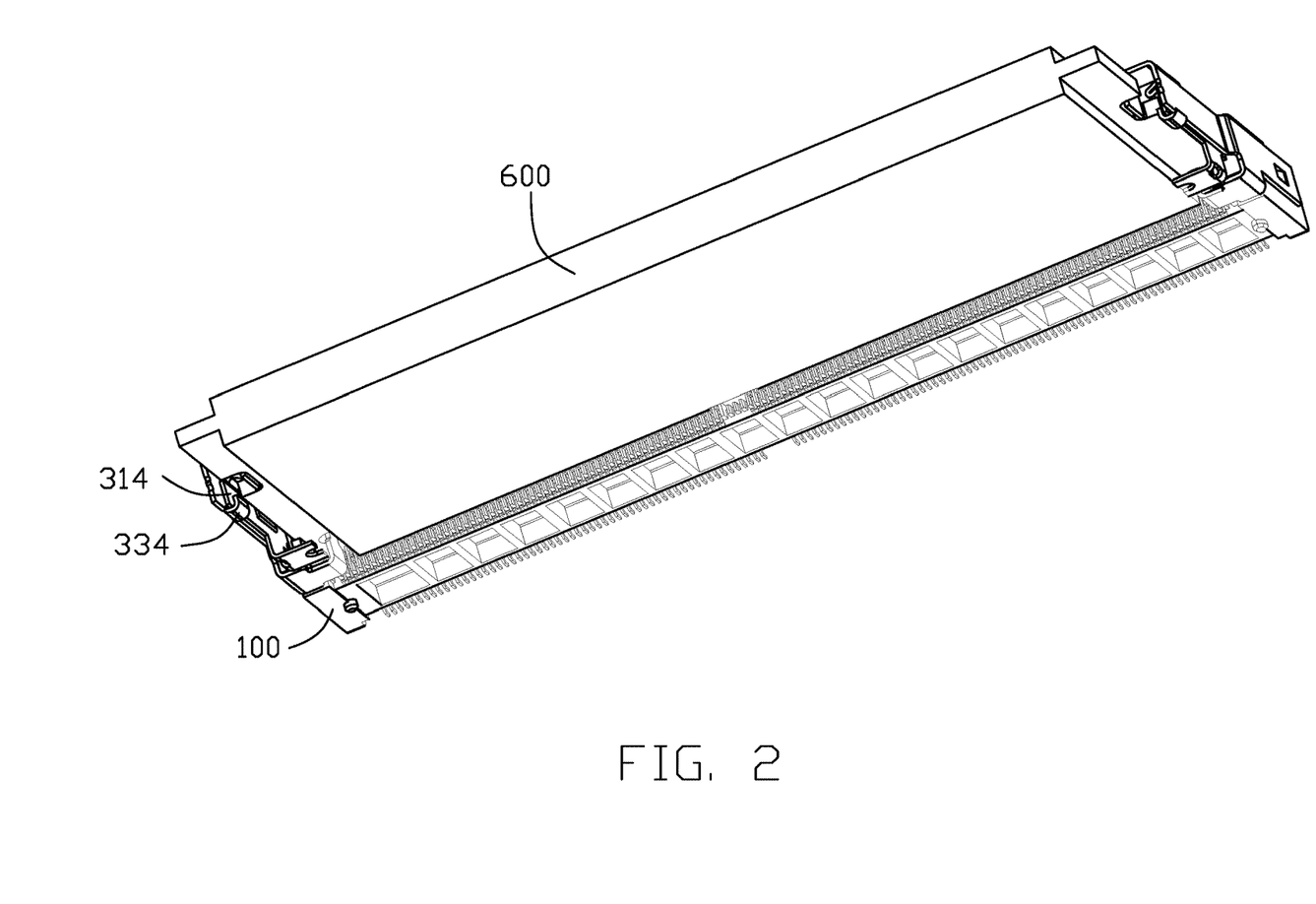
FIG. 2 is another perspective view of the electrical card edge connector assembly of FIG. 1.
Figure 3:
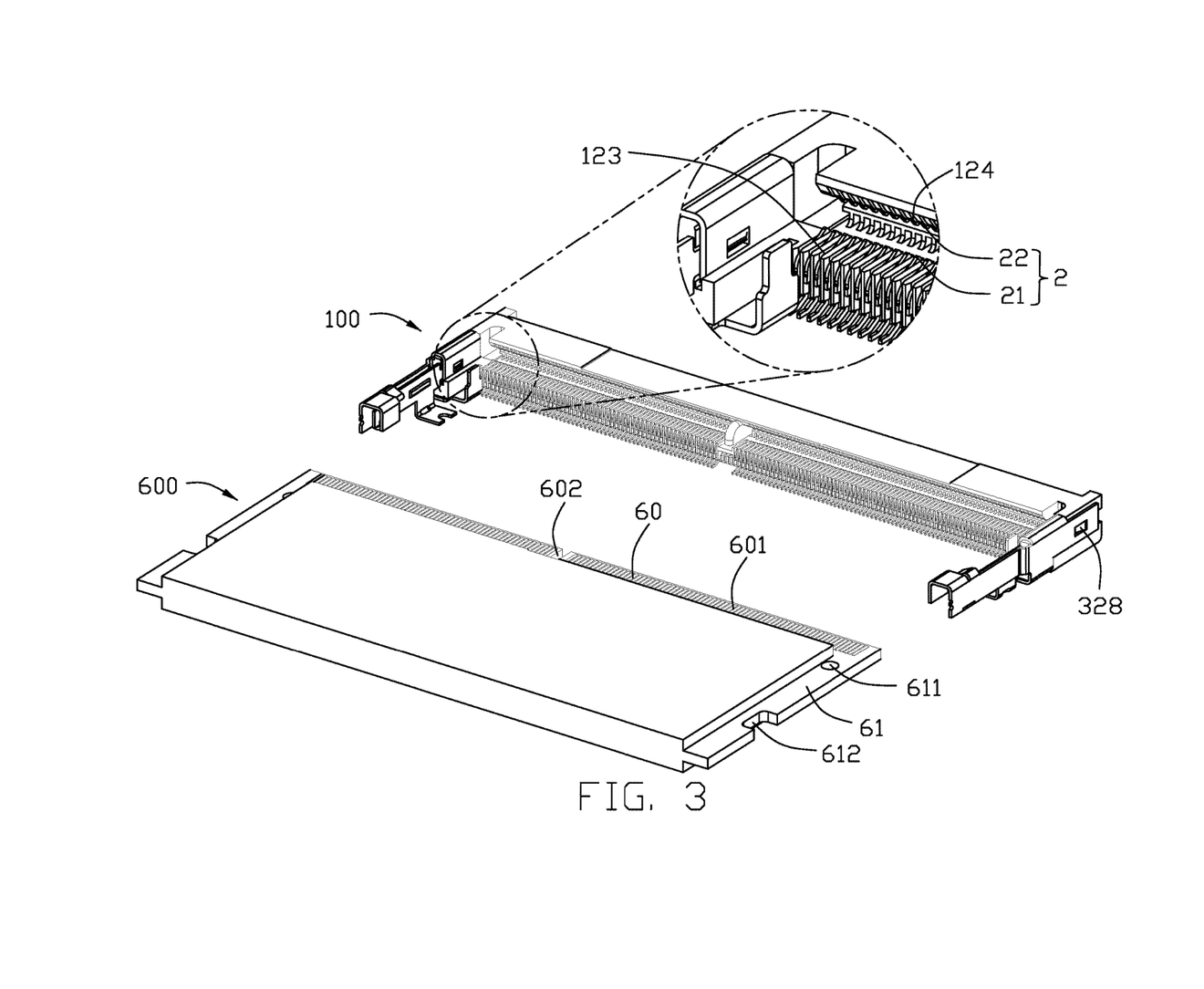
FIG. 3 is an exploded perspective view of the electrical card edge connector assembly of FIG. 1 wherein the memory module is removed from the connector.
Figure 4:
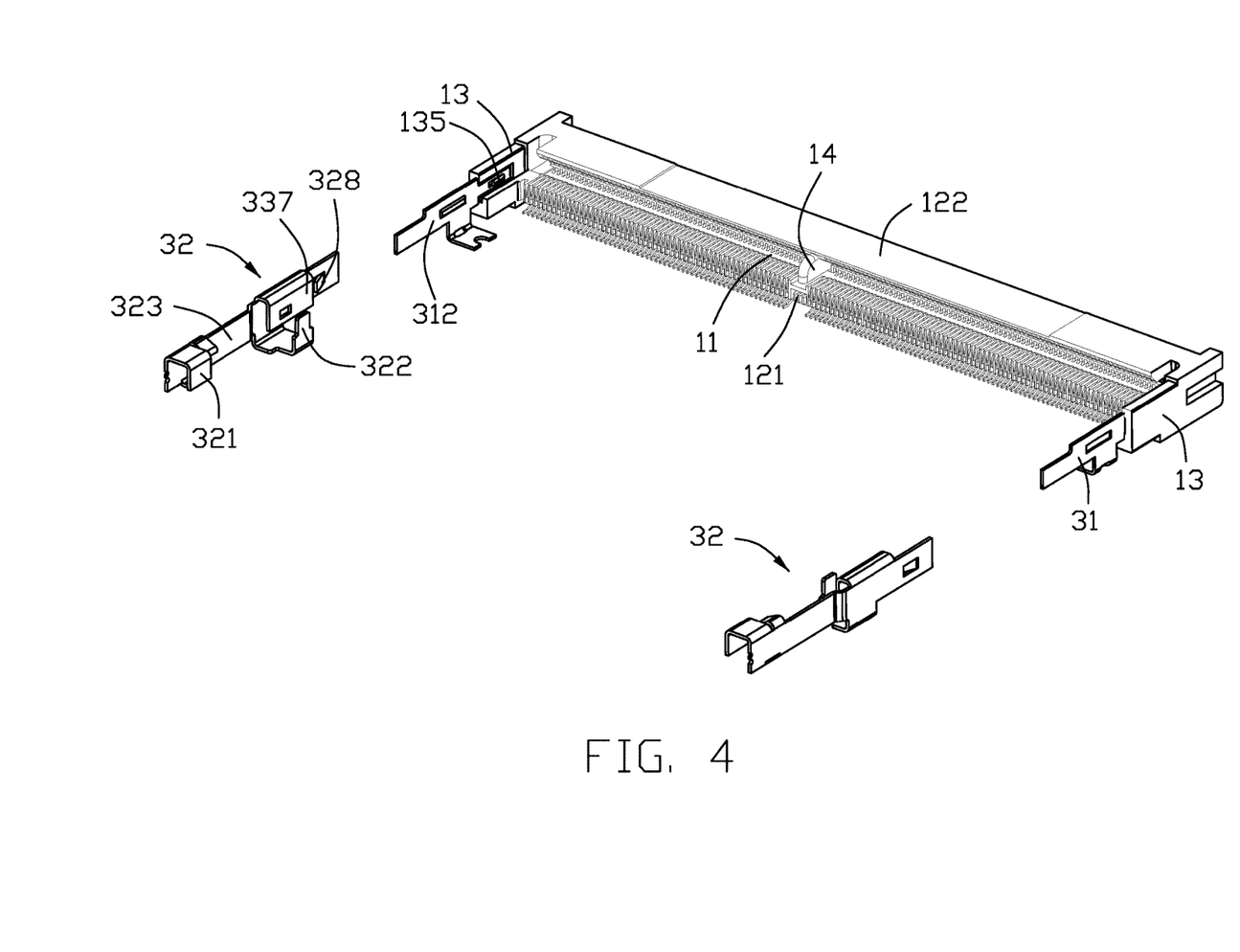
FIG. 4 is an exploded perspective view of the electrical card edge connector of FIG. 3.
Figure 5:
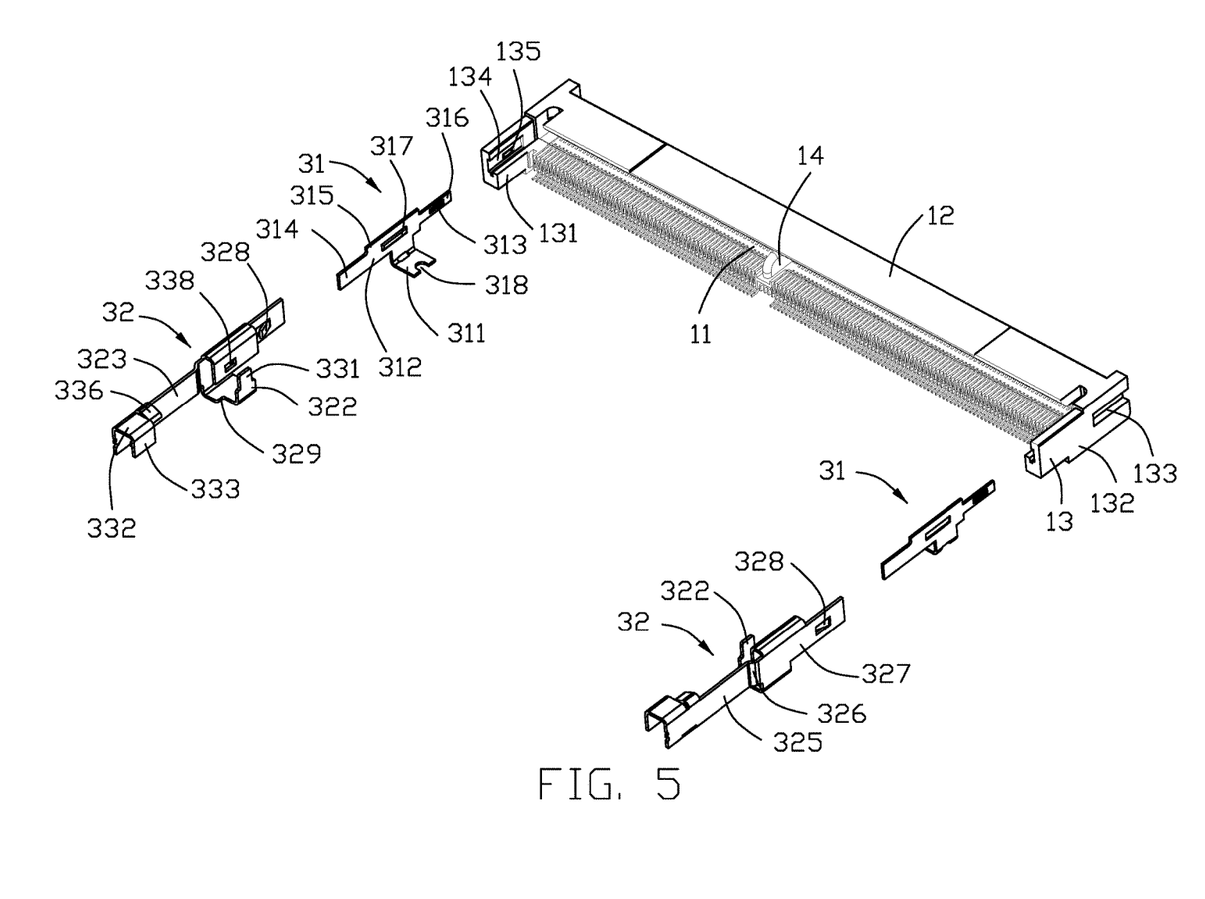
FIG. 5 is a further exploded perspective view of the electrical card edge connector of FIG. 4.
Figure 6:
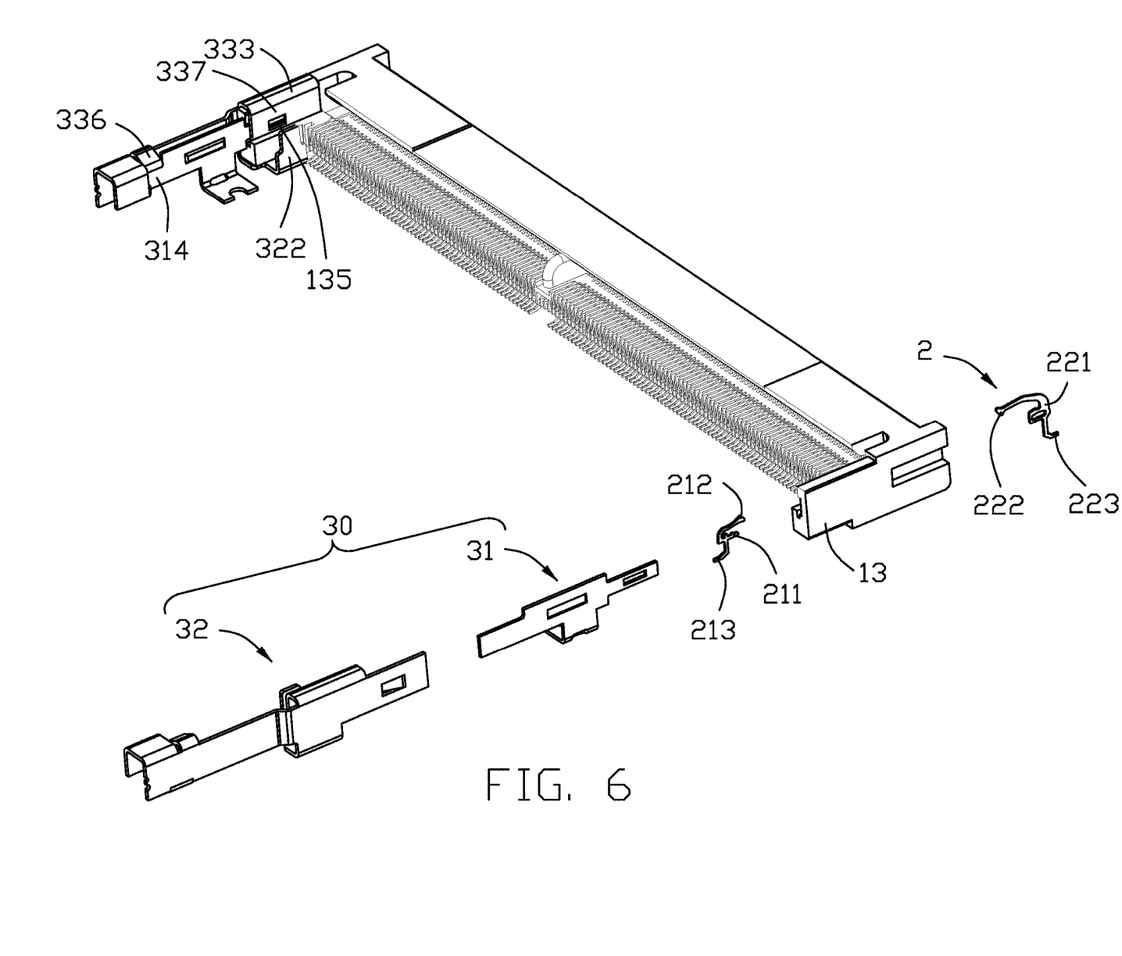
FIG. 6 is another exploded perspective view of the electrical card edge connector of FIG. 5 wherein the terminals are further disassembled from the housing.
Figure 7:
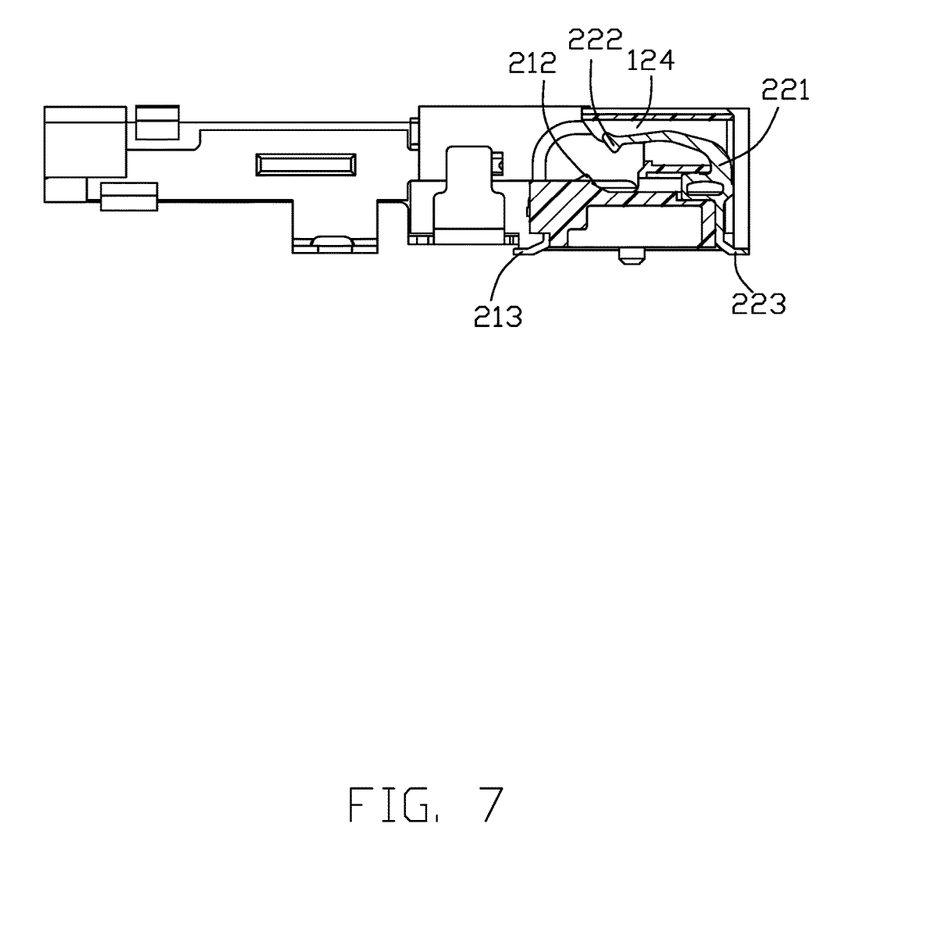
FIG. 7 is a cross-sectional view of the electrical card edge connector of FIG. 3 to show the upper terminals.
Figure 8:
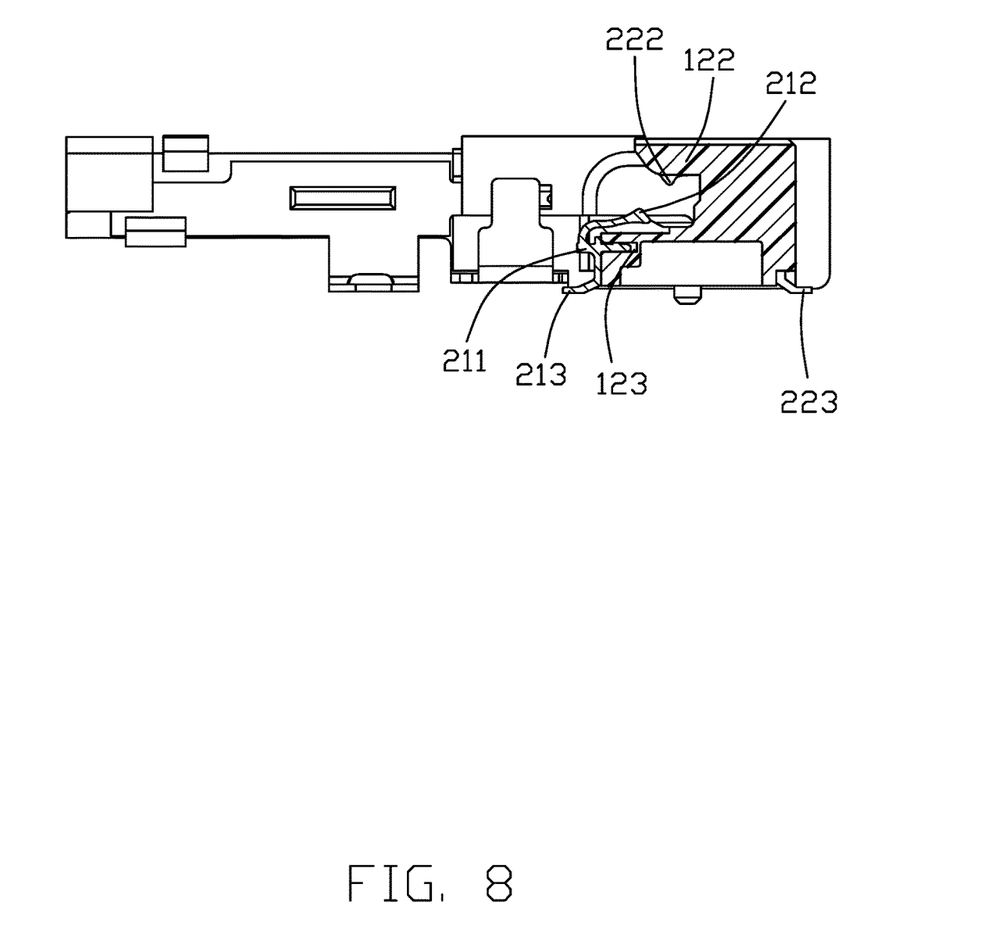
FIG. 8 is another cross-sectional view of the electrical card edge connector of FIG. 3 to show the lower terminals.
Figure 9:
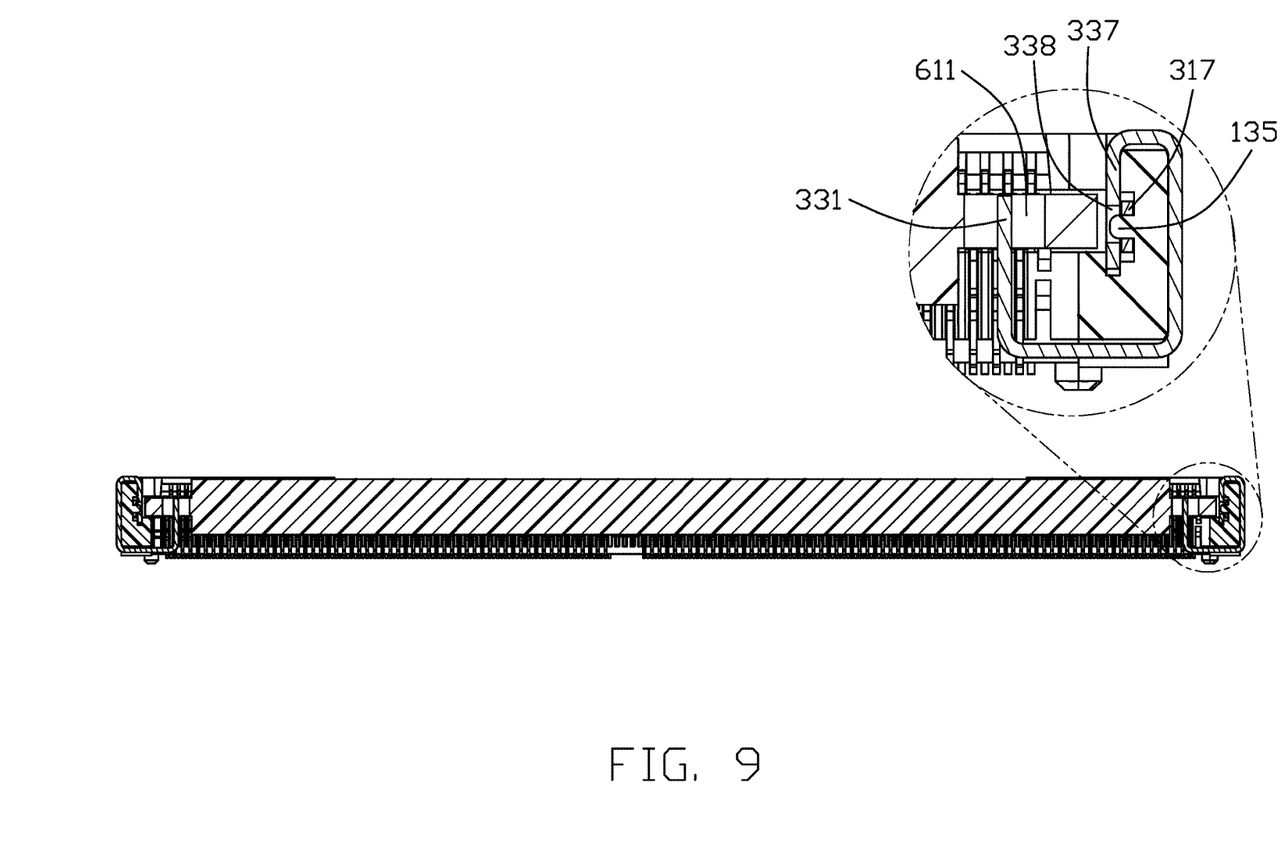
FIG. 9 is another cross-sectional view of the electrical card edge connector of FIG. 3 to show how the front restriction piece is received and engaged within the corresponding through hole.
Figure 10:
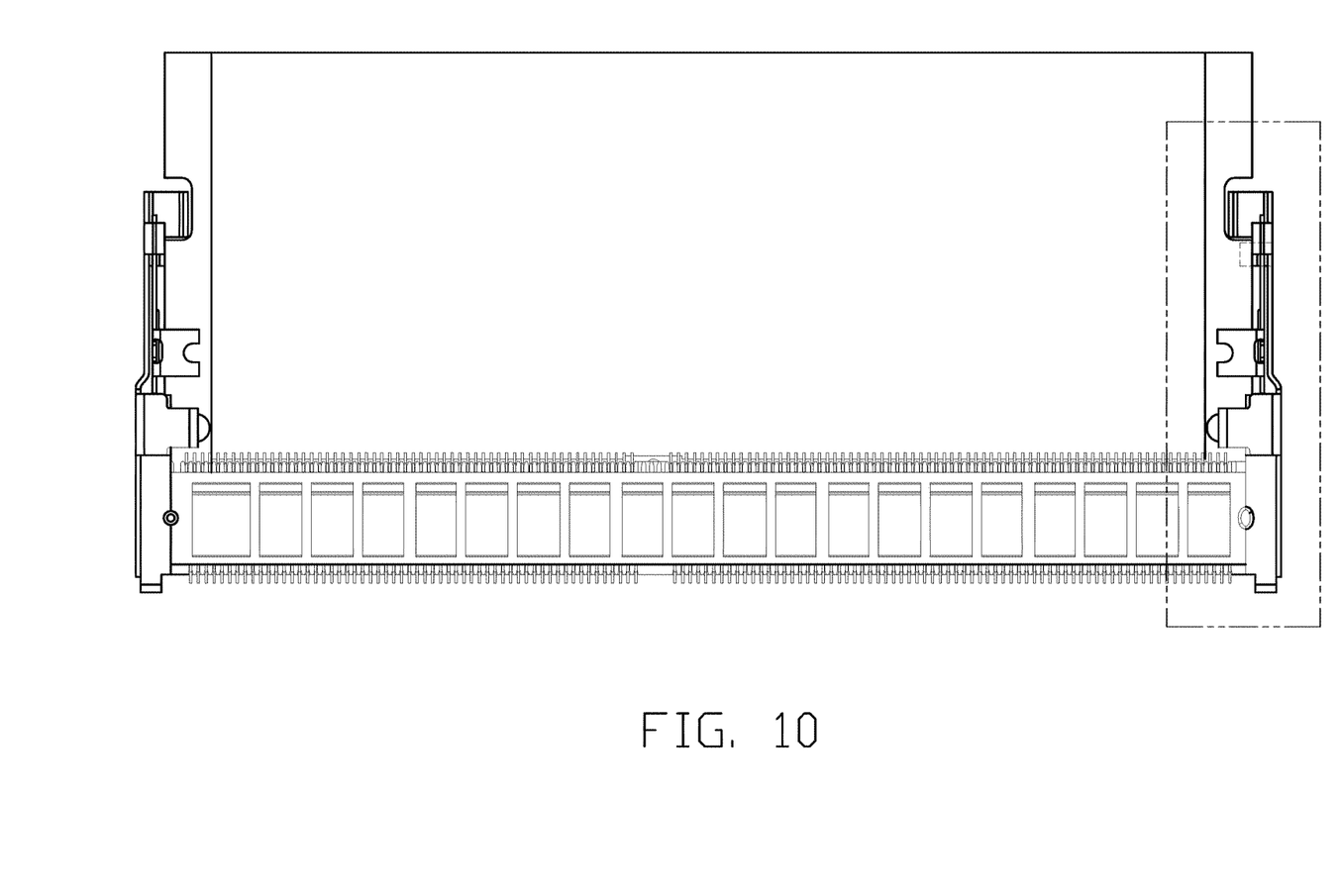
FIG. 10 is a bottom view of the electrical card edge connector of FIG. 1 to show how the locking piece presses the memory module.
Figure 11A:
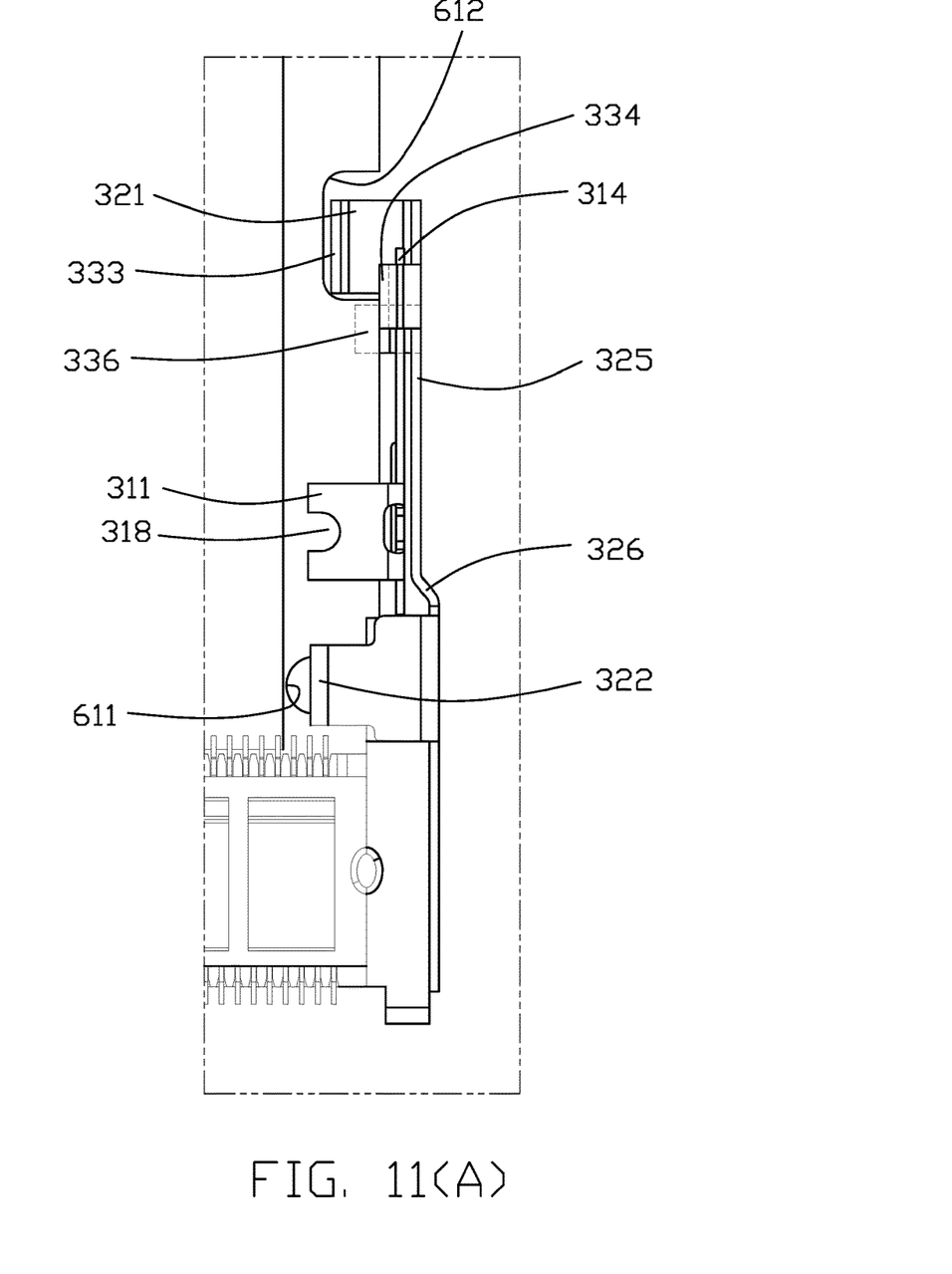
FIG. 11(A) is a partially enlarged view the electrical card edge connector of FIG. 10 wherein the metal latch is not outwardly deflected.
Figure 11B:
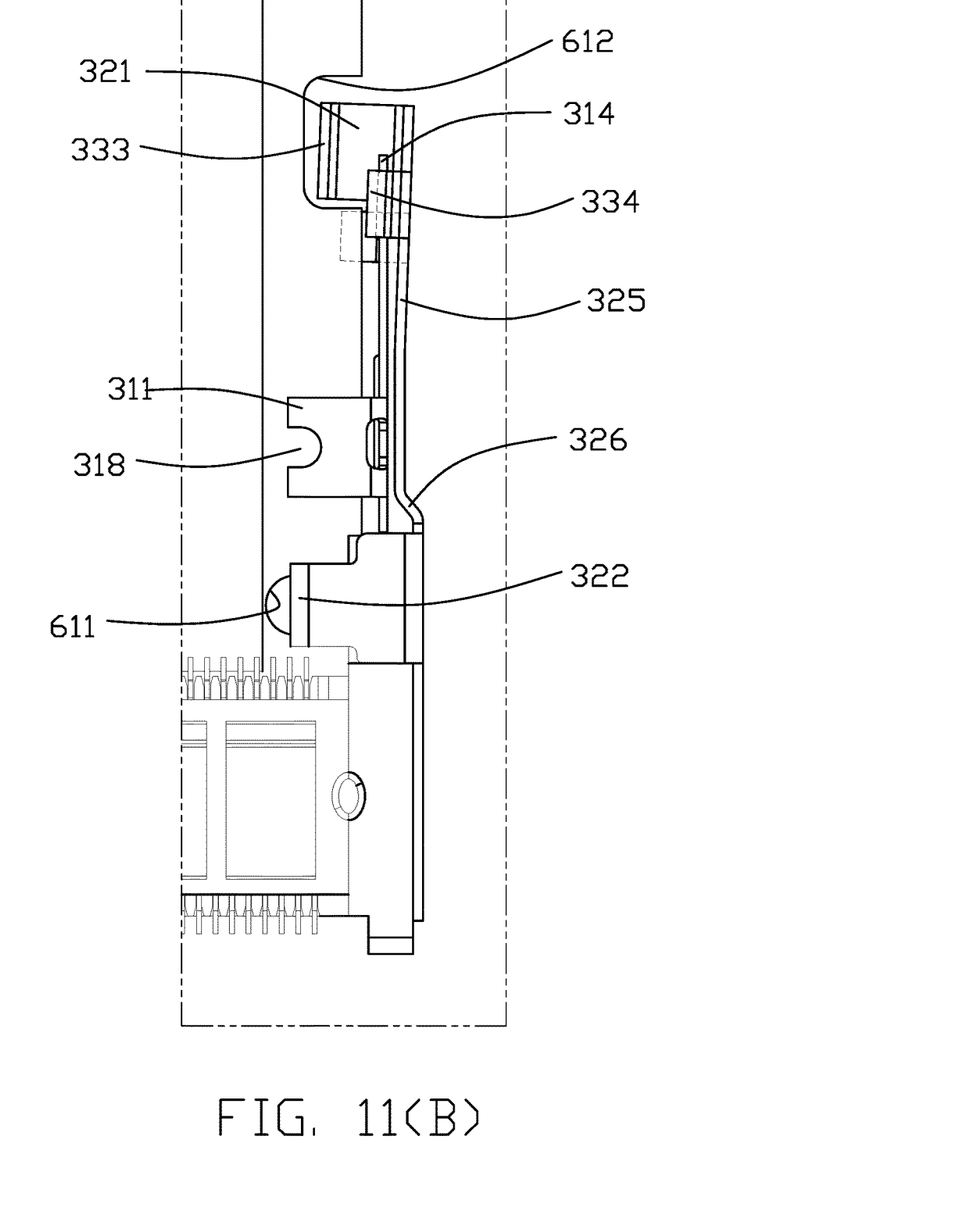
FIG. 11(B) is a partially enlarged view of the electrical card edge connector of FIG. 10 wherein the metal latch is slightly outwardly deflected.
Figure 11C:
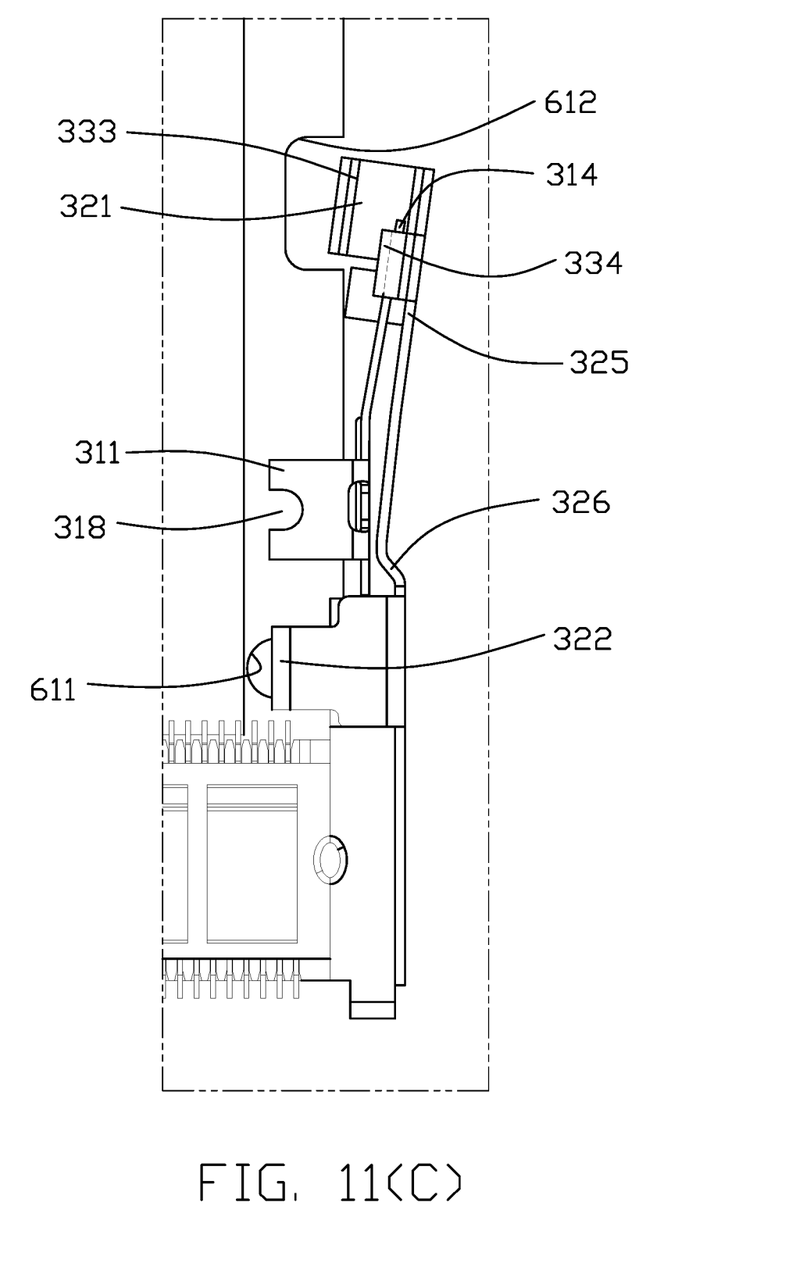
FIG. 11(c) is a partially enlarged view of the electrical card edge connector of FIG. 10 wherein the metal latch is sufficiently outwardly deflected to have the memory module fully disengaged from the locking piece disengaged.

The third section 327 includes a spring tab 328 received in the slot 133 for securing the second metal piece 32 to the end wall 13. The first section 325 includes a locking piece 336 extending downwardly from a top edge of the first section 325 for downwardly pressing the top surface of the memory module 600 during mating. The third section 327 further includes a wrapping piece 337 with therein a fixing hole 338 receiving the protrusion 135 as shown in FIG. 9.

During operation/mating, the front restriction piece 322 received within the through hole 611, the rear restriction piece 333 received in the notch 612, and the locking piece 336 downwardly presses the top surface of the memory module 600. During unlocking the memory module 600 from the connector 100, the second metal piece 32 is outwardly/laterally, along the longitudinal direction of the housing, deflected so that the locking piece 336 is disengaged from the top surface of the memory module 600 so as to allow the memory module 600 to be upwardly rotated to leave the receiving slot 11 due to complementary resilient forces of the upper terminals 22 and the lower terminal 21. Notably, in this embodiment, in the second metal latch 32 the first section 325 is deflectable while the third section 327 is essentially immovable. Therefore, during the outward movement of the first section 325, the restrain piece 334 is initially approaching the front section 314 of the first metal piece 31, and successively touches and drives the front section 314 to commonly outwardly laterally move. This arrangement may provide a reliable and reinforced metal latch for avoiding excessive outward deflection thereof. Notably, in this embodiment, the positioning part 321 may function as the operation region upon which the finger presses to outwardly deflect the corresponding metal latch 30 for disengaging the memory module 600 from the connector 100.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. An electrical card edge connector for receiving a memory module therein wherein said memory module includes a pair of through holes around a bottom region, and a pair of notches around opposite lateral side regions, comprising:
   an elongated housing including a pair of opposite side walls extending along a longitudinal direction with a receiving slot therebetween in a vertical direction perpendicular to said longitudinal direction;
   a pair of end walls connected at two opposite ends of the pair of side walls and located by two opposite longitudinal ends of the receiving slot in said longitudinal direction;
   two rows of terminals respectively disposed in the corresponding side walls;
   a pair of outwardly deflectable metal latches fixed to said pair of end walls;
   each of said metal latches including:
   a main body extending along a front-to-back direction perpendicular to both the longitudinal direction and the vertical direction;
   a front restriction piece extending upwardly from a lower edge of the main body for engagement within the through hole of the memory module;
   a rear restriction piece extending downwardly form an upper edge of the main body for engagement within the notch of the memory module; and
   a locking piece located between the front restriction piece and the rear restriction piece in the front-to-back direction and adjacent to the rear restriction piece.

2. The electrical card edge connector as claimed in claim 1, further including a solder pad formed upon each of the metal latch.

3. The electrical card edge connector as claimed in claim 2, wherein said solder pad is located between the front restriction piece and the rear restriction piece in the front-to-back direction.

4. The electrical card edge connector as claimed in claim 3, wherein each of said metal latches includes a first piece and a second piece discrete from but assembled with each other, and the front restriction piece, the rear restriction piece and the locking piece are commonly formed on the second piece while the solder pad is formed on the first piece.

5. The electrical card edge connector as claimed in claim 4, wherein the second piece is assembled upon an exterior face of the end wall while the first piece is assembled upon an interior face of the end wall.

6. The electrical card edge connector as claimed in claim 3, wherein the second piece further includes a restraint piece to actuate the first piece to outwardly laterally move commonly when the second piece is outwardly laterally moved.

7. The electrical card edge connector as claimed in claim 3, wherein the second piece further includes wrapping piece to grasp both the first piece and the end wall.

8. The electrical card edge connector as claimed in claim 7, wherein said wrapping piece and said front restriction piece are essentially located around a same position in the front-to-back direction.

9. The electrical card edge connector as claimed in claim 1, wherein said front restriction piece is immovable while the rear restriction piece is outwardly moveable.

10. An electrical card edge connector assembly comprising:
   an electrical card edge connector including:
   an elongated housing including a pair of opposite side walls extending along a longitudinal direction with a receiving slot therebetween in a vertical direction perpendicular to the longitudinal direction;
   a pair of end walls connected at two opposite ends of the pair of side walls and located by two opposite longitudinal ends of the receiving slot in said longitudinal direction;
   two rows of terminals respectively disposed in the corresponding side walls;
   a pair of metal latches fixed to said pair of end walls;
   a memory module having a bottom region received within the receiving slot and a pair of side regions each equipped with a through hole adjacent to the bottom region and a notch;
   each of said metal latches including:
   a main body extending along a front-to-back direction perpendicular to both the longitudinal direction and the vertical direction;
   a front restriction piece extending upwardly from a lower edge of the main body for engagement within the through hole of the memory module;
   a rear restriction piece extending downwardly form an upper edge of the main body for engagement within the notch of the memory module; and
   a locking piece located between the front restriction piece and the rear restriction piece in the front-to-back direction and adjacent to the rear restriction piece for downwardly pressing an upper surface of the memory module.

11. The electrical card edge connector assembly as claimed in claim 10, further including a solder pad formed upon each of the metal latch.

12. The electrical card edge connector assembly as claimed in claim 11, wherein said solder pad is located between the front restriction piece and the rear restriction piece in the front-to-back direction.

13. The electrical card edge connector assembly as claimed in claim 12, wherein each of said metal latches includes a first piece and a second piece discrete from but assembled with each other, and the front restriction piece, the rear restriction piece and the locking piece are commonly formed on the second piece while the solder pad is formed on the first piece.

14. The electrical card edge connector as claimed in claim 12, wherein the second piece is assembled upon an exterior face of the end wall while the first piece is assembled upon an interior face of the end wall.

15. The electrical card edge connector assembly as claimed in claim 12, wherein the second piece further includes a restraint piece to actuate the first piece to outwardly laterally move commonly when the second piece is outwardly laterally moved.

16. The electrical card edge connector assembly as claimed in claim 12, wherein the second piece further includes wrapping piece to grasp both the first piece and the end wall.

17. The electrical card edge connector assembly as claimed in claim 16, wherein said wrapping piece and the front restriction piece are located around a same position in said front-to-back direction.

18. An electrical card edge connector for receiving a memory module therein wherein said memory module includes a pair of through holes around a bottom region, and a pair of notches around opposite lateral side regions, comprising:
   an elongated housing including a pair of opposite side walls extending along a longitudinal direction with a receiving slot therebetween in a vertical direction perpendicular to said longitudinal direction;
   a pair of end walls connected at two opposite ends of the pair of side walls and located by two opposite longitudinal ends of the receiving slot in said longitudinal direction;
   two rows of terminals respectively disposed in the corresponding side walls;
   a pair of metal latches fixed to said pair of end walls;
   each of said metal latches including:
   a main body extending along a front-to-back direction perpendicular to both the longitudinal direction and the vertical direction;
   a front restriction piece extending upwardly from a front section of the main body for engagement within the through hole of the memory module;
   a rear restriction piece extending form a rear section of the main body for engagement within the notch of the memory module;
   a locking piece located between the front restriction piece and the rear restriction piece in the front-to-back direction and adjacent to the rear restriction piece; and
   a solder pad locate between the front restriction piece and the locking piece in the front-to-back direction.

19. The electrical card edge connector as claimed in claim 18, wherein said front restriction piece is located inside the corresponding end wall in the longitudinal direction while said solder pad is exposed outside of the corresponding end wall in the front-to-back direction.

20. The electrical card edge connector as claimed in claim 19, wherein said front restriction piece is immovable while said front restriction piece and said locking piece are laterally movable.

* * * * *